United States Patent
Lipcsei et al.

(10) Patent No.: US 6,965,221 B2
(45) Date of Patent: Nov. 15, 2005

(54) CONTROLLER FOR DC TO DC CONVERTER

(75) Inventors: Laszlo Lipcsei, San Jose, CA (US); Serban-Mihai Popescu, Campbell, CA (US)

(73) Assignee: O2Micro International Limited, Grand Cayman (KY)

(*) Notice: Subject to any disclaimer, the term of this patent is extended or adjusted under 35 U.S.C. 154(b) by 0 days.

(21) Appl. No.: 10/389,037

(22) Filed: Mar. 14, 2003

(65) Prior Publication Data

US 2004/0090804 A1 May 13, 2004

Related U.S. Application Data

(60) Provisional application No. 60/425,553, filed on Nov. 12, 2002.

(51) Int. Cl.⁷ .................................................. G05F 1/40

(52) U.S. Cl. ..................... 323/283; 323/224; 323/285

(58) Field of Search ........................... 363/16, 17, 18, 363/19, 20, 97, 95, 41, 46; 323/282, 283, 284, 288, 287, 286, 290

(56) References Cited

U.S. PATENT DOCUMENTS

| 6,137,240 | A | | 10/2000 | Bogdan | 315/307 |
| 6,157,182 | A | * | 12/2000 | Tanaka et al. | 323/284 |
| 6,313,616 | B1 | | 11/2001 | Deller et al. | 323/282 |
| 6,366,070 | B1 | | 4/2002 | Cooke et al. | 323/284 |
| 6,377,032 | B1 | * | 4/2002 | Andruzzi et al. | 323/228 |
| 6,396,250 | B1 | * | 5/2002 | Bridge | 323/283 |

* cited by examiner

*Primary Examiner*—Rajnikant B. Patel
(74) *Attorney, Agent, or Firm*—Grossman, Tucker, Perreault & Pfleger PLLC

(57) ABSTRACT

A controller for a DC to DC converter is configured to provide a PWM signal in a first state during a first time interval based on an input voltage less a voltage level representative of an output voltage of the DC to DC converter. The controller may provide the PWM signal in the first state based on the time it takes to charge an energy storage element of the controller to a predetermined level. The controller may also provide an estimator of a zero inductor current level in an associated inductor when the energy storage element is completely discharged. The controller may also be a digital controller that counts time pulses to provide the PWM signal. A DC to DC converter including such a controller and associated methods are also provided.

37 Claims, 5 Drawing Sheets

US 6,965,221 B2

CONTROLLER FOR DC TO DC CONVERTER

CROSS REFERENCE TO RELATED APPLICATIONS

This application claims the benefit of the filing date of U.S. Provisional Application Ser. No. 60/425,553, filed Nov. 12, 2002, the teachings of which are incorporated herein by reference.

FIELD OF THE INVENTION

The present invention relates controllers for DC to DC converters and in particular to controllers for controlling inductor current levels without directly measuring such current levels.

BACKGROUND OF THE INVENTION

DC to DC converters are used to convert an input DC voltage to an output DC voltage. Such converters may step down (buck) or step up (boost) the input DC voltage. One type of buck converter is a synchronous buck converter. This converter typically has a controller, driver, a pair of switches, and an LC filter coupled to the pair of switches. The controller provides a control signal to the driver which then drives the pair of switches, e.g., a high side switch and a low side switch. The driver alternately turns each switch ON and OFF thereby controlling inductor current and the output voltage of the DC to DC converter. Such controllers typically utilize a pulse width modulated signal to control the state of the high and low side switches.

In general, if the PWM signal is high, the high side switch is ON and the low side switch if OFF. This state of switches will be referred to herein as a "switch ON" state. In this state, the inductor is coupled to the input voltage source. In a buck converter, the input voltage is necessarily greater than the output voltage so there is a net positive voltage across the inductor in this switch ON state. Accordingly, the inductor current begins to ramp up. If the PWM signal is low, the high side switch is OFF and the low side switch is ON. This state of switches will be referred to as a "switch OFF" state. In a buck converter, there is a net negative voltage across the inductor in this state. Accordingly, the inductor current begins to ramp down during this low side switch OFF state. Hence, the pulse width of the PWM signal determines the time on for the switch ON state and the time off for the switch OFF state. Such pulse width may be adjusted by directly monitoring the inductor current level via a sense resistor or by comparing the output voltage with a reference voltage level.

Accordingly, there is a need in the art for a controller for a DC to DC converter that provides a PWM signal during a first time interval based on an input voltage to the DC to DC converter less a signal representative of the output voltage.

BRIEF SUMMARY OF THE INVENTION

A controller for a DC to DC converter consistent with the invention is configured to convert an input voltage to an output voltage. The controller is configured to provide a PWM signal in a first state during a first time interval based on a first signal representative of the input voltage less a second signal representative of the output voltage.

In one embodiment, the controller may include a first current source configured to provide a first current level, and a second current source configured to provide a second current level. The controller may further include an energy storage element configured to be charged by a charging current equal to the second current level less the first, current level during the first time interval.

In another embodiment, the controller may include a on-time one shot circuit configured to provide the PWM signal in the first state during the first time interval.

In another aspect of the invention, a method of controlling a pair of switches in a DC to DC converter is provided. The method includes: monitoring a first voltage level representative of an input voltage to the DC to DC converter; monitoring a second voltage level representative of an output voltage of the DC to DC converter; and determining a first time interval to drive a pair of switches to a switch ON state based on a difference between the first signal and the second signal.

In a further embodiment of the invention, a DC to DC converter for converting an input voltage to an output voltage is provided. The DC to DC converter includes: a controller configured to provide a PWM signal in a first state during a first time interval based on a first signal representative of the input voltage less a second signal representative of the output voltage; a driver circuit configured to accept at least the PWM signal and provide a switch driving signal; a pair of switches including a high side switch and a low side switch responsive to the switch driving signal to drive the pair of switches to a switch ON state where the high side switch is ON and the low side switch is OFF when the PWM signal is in the first state; and an inductor coupled to an output of the pair of switches, wherein a current level in the inductor increases in the switch ON state.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1A:
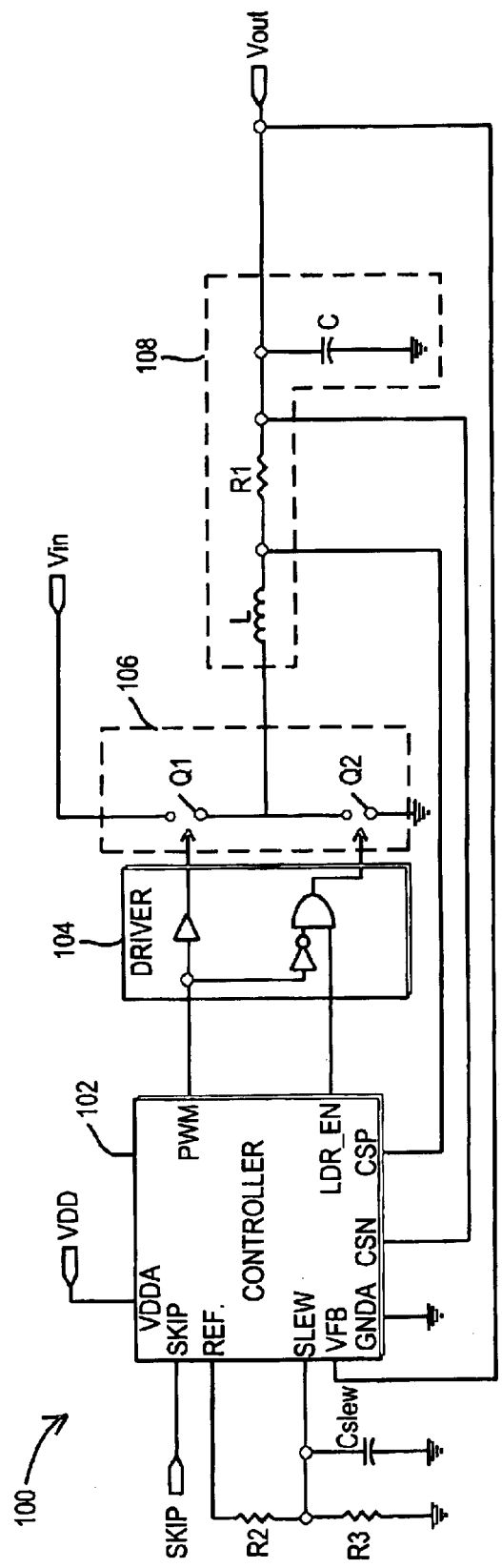
FIG. 1A is a block diagram of a DC to DC converter including a controller consistent with the present invention.

FIG. 1A illustrates an exemplary DC to DC converter 100 including a controller 102 consistent with the present invention. The controller 102 consistent with the invention may be utilized with a variety of DC to DC converters. The illustrated DC to DC converter 100 is a synchronous buck converter generally including the controller 102, a driver circuit 104, a pair of switches 106 including a high side switch Q1 and a low side switch Q2, and a low pass filter 108. The low pass filter includes an inductor L and a capacitor C.

The controller 102 is generally configured to provide a PWM signal and a low side switch enable signal (LDR_EN)

to the driver circuit 104. Based on such signals, the driver circuit 104 controls the state of the high side switch Q1 and the low side switch Q2.

The controller 102 has a target input terminal SLEW where the desired output voltage is set. In the exemplary embodiment of FIG. 1, the slew capacitor Cslew charges based on the value of the resistors in the resistor divider R2/R3 and the value of the reference voltage REF. Those skilled in the art will recognize various ways to charge the slew capacitor Cslew and create the target voltage signal. In this instance, the voltage slews from 0 to a set value due to the slew capacitor Cslew. An optional sense resistor R1 may be utilized to provide a feedback voltage level to terminals CSN and CSP of the controller 102 representative of the current level through the inductor L. In addition, terminal VFB of the controller 102 may accept a feedback signal representative of the output voltage level Vout.

Figure 1B:
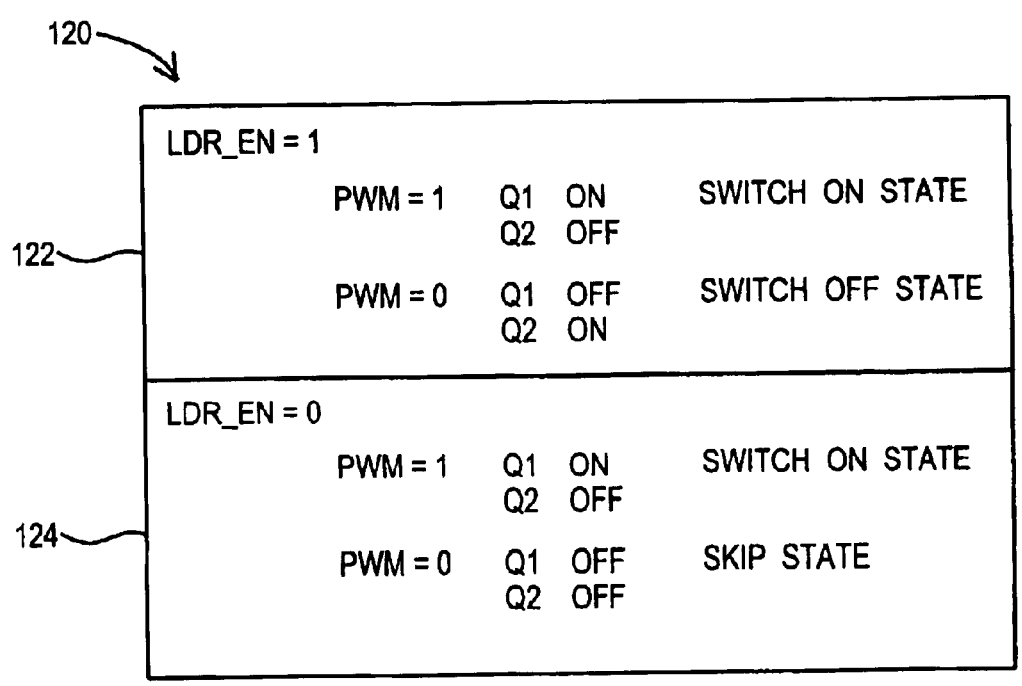
FIG. 1B is an exemplary table illustrating switch states for the pair of switches of FIG. 1A based on the input PWM signal and low side enable signal.

Turning to FIG. 1B, an exemplary table 120 illustrating various switch states of the high side switch Q1 and the low side switch Q2 of FIG. 1A is illustrated for various PWM and LDR_EN signals. If the LDR_EN signal is a digital one as in category 122 of the table 120, then the state of the PWM signal controls the switches Q1 and Q2. For instance, Q1 is ON and Q2 is OFF in this instance 122 if PWM is a digital one. This is referred to as a switch ON state. In addition, Q1 is OFF and Q2 is ON in this instance 122 if PWM is a digital zero. This is referred to as a switch OFF state.

In contrast, if the LDR_EN signal is digital zero and PWM is a digital one, then the switches Q1 and Q2 are in the switch ON state. However, if PWM is a digital zero in this instance, the low side switch Q2 remains open. As such, both the high side switch Q1 and the low side switch Q2 are OFF in this skip state or switch disabled state. The switching side of the inductor L will therefore be left floating in such a skip state.

The inductor L has one end attached to the output DC voltage and the other switch end alternately attached to input voltage Vin or ground depending on the state of the switches Q2 and Q1 (switch ON or switch OFF state). In the switch ON state, the inductor is coupled to input voltage Vin. Neglecting the voltage drop across the sense resistor R1 which is quite small, the voltage difference between the terminals of the inductor L is equal to Vin−Vout. In a buck converter, the input voltage Vin is necessarily larger than the output voltage Vout, so there is a net positive voltage across the inductor and the inductor current ramps up according to equation 1 during the switch ON state.

$$di/dt=(Vin-Vout)/L=\Delta I/Ton \quad (1)$$

In equation 1, Vin is the input voltage to the DC to DC converter, Vout is the output voltage of the DC to DC converter, Ton is the time interval duration that the switches Q1 and Q2 are in the switch ON state, L is the value of the inductor L, and $\Delta I$ is the change in the inductor current during Ton. During the switch OFF state, the voltage across the inductor L is proportional to Vout. In a buck converter in this instance, there is a net negative voltage across the inductor and the inductor current ramps down according to equation 2.

$$di/dt=(Vout)/L=\Delta I/Toff \quad (2)$$

In equation 2, Vout is the output voltage of the DC to DC converter, Toff is the time interval duration that the switches Q1 and Q2 are in the switch OFF state, L is the value of the inductor L, and $\Delta I$ is the change in the inductor current during Toff.

Figure 2A:
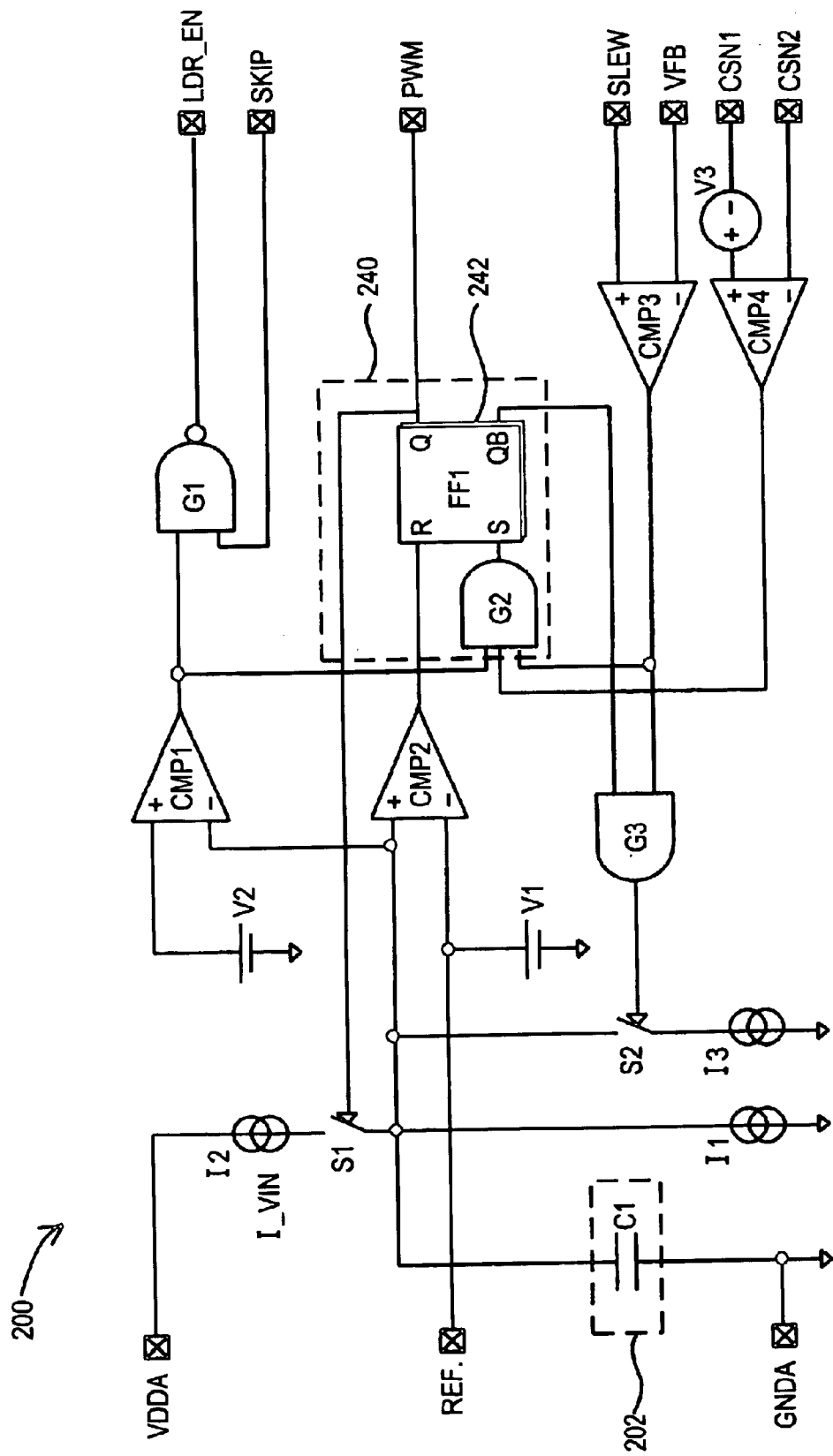
FIG. 2A is a block diagram of one embodiment of a controller for use with the DC to DC converter of FIG. 1.

Turning to FIG. 2A, a more detailed block diagram of one embodiment of a controller 200 for use with the DC to DC converter of FIG. 1 is illustrated. In general, the controller 200 provides a digital one PWM signal to place the switches Q1, Q2 in the switch ON state based on a difference between a first signal representative of the input voltage less a second signal representative of the output voltage. The second signal may be a target voltage level signal, e.g., Vslew, or it may be an output voltage level signal, e.g., Vout. In general, use of a target voltage level signal offers smoother current generation. In a buck converter, the duty cycle of a PWM signal from the controller 200 is generally inversely proportional to the difference between the input voltage and the output voltage or the target voltage. In other words, as this difference increases, the duty cycle of the PWM signal decreases thereby decreasing the "switch ON" time of the switches Q1 and Q2. Conversely, as the difference between the first signal and second signal decreases, the duty cycle of the PWM signal increases thereby decreasing the "switch OFF" time of the switches Q1 and Q2.

In the embodiment of FIG. 2A, such control is generally dictated by charging an energy storage element 202 during a first time interval and discharging the energy storage element 202 during a second time interval. During the first time interval the PWM output signal is a digital one and hence the switches Q1 and Q2 are in the switch ON state and the inductor current rises in proportion to the charge on the energy storage element 202. Once the charge on the energy storage element 202 reaches a predetermined charge threshold level, the PWM signal changes to a digital zero and hence the switches are driven to the switch OFF state. Accordingly, the inductor current then decreases in proportion to the decrease in the charge on the energy storage element 202.

The controller 200 may generally include various current sources I1, I2, and I3 for charging and discharging the energy storage element 202 based on the results of various voltage comparisons by comparators CMP2, CMP3, and CMP4. The first current source I1 is proportional to the output voltage or a target voltage, e.g., Vslew, and configured to provide a first current level and the second current source I2 is proportional to the input voltage of the DC to DC converter and configured to provide a second current level. Finally, a third current source I3 is proportional to the output voltage and configured to provide a third current level which is typically, but not necessarily, greater than the first current level. The third current source I3 is not mandatory. However, it helps to filter out the parasitic triggering of a new PWM pulse. If the third current source I3 is not utilized, switch S2 can directly discharge the energy storage element 202. The controller 200 may also include an output decision circuit 240 to provide the PWM signal to the switch driver circuit.

The controller 200 may further include a first comparator CMP1 that is configured to compare the charge on the energy storage element 202, e.g., capacitor C1, with a second voltage reference V2. The second voltage reference may be a nominal value, e.g., 20 mV in one embodiment, coupled to the positive terminal of the comparator CMP1 such that CMP1 provides a high signal if the charge on the energy storage element is below the nominal V2 value.

The output of the comparator CMP1 may be further coupled to NAND gate G1. A SKIP input may also be coupled to another input of the NAND gage G1. If the SKIP signal is digital zero, then the LDR_EN signal is a digital one regardless of the signal from the comparator CMP1 and hence the PWM signal controls the state of the switches Q1, Q2. If however, SKIP is a digital one and the output from CMP1 is digital one, then the output of NAND gate G1 is a digital zero. As such, if PWM is a digital zero, then both switches Q1 and Q2 will be driven OFF.

In operation, the charge on the energy storage element 202 is initially set at zero volts since it is discharged to ground and the output decision circuit 240 provides a digital zero PWM signal. When the controller is enabled, the SLEW voltage will start to increase from zero towards the ratio based on R2 and R3. The comparator CMP3 will then sense the SLEW voltage is greater than the feedback voltage VFB, which is representative of the output voltage Vout, and provide a digital one signal to the AND gate G2 of the output decision circuit 240.

Since there is no current yet through the inductor L, the comparator CMP4 does not sense an over-current condition and provides a digital one signal to the AND gate G2. In addition, since the charge on the energy storage element 202 element has been discharged to zero volts, the output signal of the comparator CMP1 is also a digital one when comparing the charge to the nominal voltage threshold V2. As such, all input signals to the AND gate G2 are a digital one and the flip flop 242 is set. At that moment, the PWM signal goes to a digital one and switch S1 is closed.

When switch S1 is closed, the energy storage element 202 is charged by a current level equal to the second current level provided by the second current source I2 less the first current level provided by the first current source I1. Advantageously, the first current source I1 may provide a first current level representative of the output voltage, e.g., this may be directly proportional to the output voltage level, e.g., Vout, or a target voltage level, e.g., Vslew or Vtarget. As such, the energy storage element 202 is charged with a current level proportional to I (Vin−Vout) or (Vin−Vslew).

The energy storage element 202 is charged until it reaches a predetermined threshold voltage level, e.g., V1 or 2.5 volts in one embodiment. The comparator CMP2 compares the charge on the energy storage element 202 with the predetermined threshold voltage level V1 and provides an output signal to the output decision circuit 240 based on the difference. If the charge on the energy storage element 202 reaches the predetermined threshold voltage level V1, then comparator CMP2 will output a digital one signal to the reset terminal R of the flip flop 242 resetting the flip flop so its output Q is moved to a digital zero and hence the PWM signal is also moved to a digital zero.

At this time, switch S1 is open since output Q is a digital zero. As such, the energy storage element 202 is now discharged by current source I1. An accelerated discharge of the energy storage element 202 may also occur if the output of the AND gate G3 is a digital one. This occurs if the PWM signal is a digital zero hence one input to the AND gate G3 from the QB terminal of the flip flop 242 is a digital one. In addition, the other input to the AND gate G3 from comparator CMP3 is a digital one if the feedback voltage VFB signal is less than the SLEW voltage. As such, a digital one from the AND gate G3 will close switch S2. As such, a third current source I3 may also be coupled to the energy storage element 202 to provide an accelerated discharge. In one embodiment, the current source I3 has a value of 10×I_Vout, but its value can be adjusted depending on the particular energy storage element 202 and other parameters to find a desired accelerated discharge level. Alternatively, the third current source I3 may be replaced by a short such that switch S2 will discharge the energy storage element to ground.

The voltage level on the energy storage element 202 will continue to be discharged while the PWM signal is a digital zero. It may be discharged at a normal rate or an accelerated rate depending on a comparison of the SLEW voltage with the feedback voltage VFB as provided by comparator CMP3.

Once the voltage level on the energy storage element 202 is discharged to a value less than the nominal threshold level V2 (hence the output of comparator CMP1 is a digital one), and the outputs of comparators CMP3 and CMP4 are also a digital one, a new PWM pulse is generated as the output Q of the flip flop goes to a digital one.

Figure 2B:
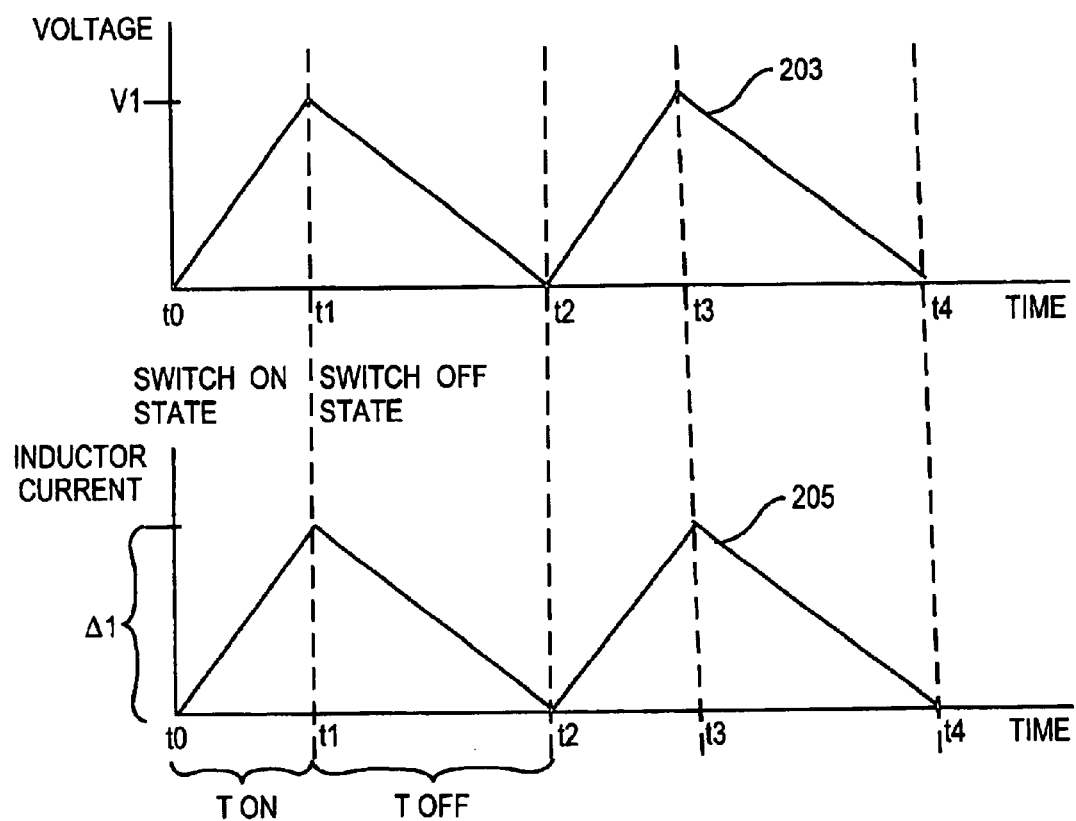
FIG. 2B is a plot illustrating the changes in charge level on the energy storage element of the controller of FIG. 2A compared to the associated changes in inductor current levels over similar time intervals.

Turning to FIG. 2B in conjunction with FIG. 2A, a plot 203 of the voltage level on the energy storage element 202 over time is illustrated. In addition another plot 205 of the inductor current level in inductor L is illustrated over similar time intervals. For instance, at the start time (t0) of operation of the controller 200 the charge on the energy storage element is zero volts. Over a first time interval or Ton between time t0 and t1 when the PWM output signal is a digital one, the voltage level on the energy storage element 202 rises linearly until the charge level reaches a predetermined charge threshold level V1, e.g., 2.5 volts in one embodiment.

As such, Ton between time t0 and t1 depends on the difference between a signal representative of the input voltage Vin and a signal representative of the output voltage, e.g., Vout or Vtarget, since the energy storage element 202 is charged during this time interval with a current level equal proportionate to this difference (current source I2−I1). The duration of Ton also depends on the threshold voltage level V1 and the value of the energy storage element 202. Where the energy storage element is a capacitor C1 and the second current source is directly proportional to Vout, the duration of the Ton is given by equation 3 below:

$$T\text{on}=C1*V1/I(V\text{in}-V\text{out}) \qquad (3)$$

Where C1 is the value of the capacitor C1, V1 is predetermined charge threshold level (2.5 volts in one example) and I (Vin−Vout) is the value of the charging current provided by the difference between the second current source I2 and the first current source I1 when the second current source is directly proportional to Vout.

If the Ton as represented in equation (3) is utilized as the Ton for the inductor current in equation (1), then equation (1) can be rewritten as $$\Delta I=(V\text{in}-V\text{out})*(C1*V1/I(V\text{in}-V\text{out}))/L \qquad (4)$$

Since (Vin−Vout)/I(Vin−Vout) is constant then ΔI=constant because every other term (L, V1, and C1) is a constant.

As such, during the Ton state between t0 and t1, the inductor current rises proportionately to the rise in the voltage level of the energy storage element 202. During a second time interval between t1 and t2, the charge level on the energy storage element is decreased due to discharging. In comparison, the inductor current level also decreases over this time period. Advantageously, when the charge level on the energy storage element 202 reaches zero, e.g., at time t2, the inductor current level at time t2 should be zero. As such, the controller 200 also provides a zero crossing inductor current estimator.

The skipping mode when enabled (when the SKIP signal is a digital one) uses this fact that for every PWM pulse the starting inductor current is zero and the energy storage element is completely discharged. When the energy storage element is discharged below the nominal value V2, the output of the comparator CMP1 becomes a digital one. If the skipping mode is enabled then LDR_EN is forced to a digital zero through AND gate G1. So when the inductor current crosses zero, the low side switch Q2 will be OFF as well the high side switch Q1. Therefore, the switching side of the inductor L will be left floating. The skipping mode is useful for light load conditions because a new PWM cycle will start when the load discharges the energy storage element, thus minimizing the Q1 and Q2 switching and conduction losses.

Figure 3:
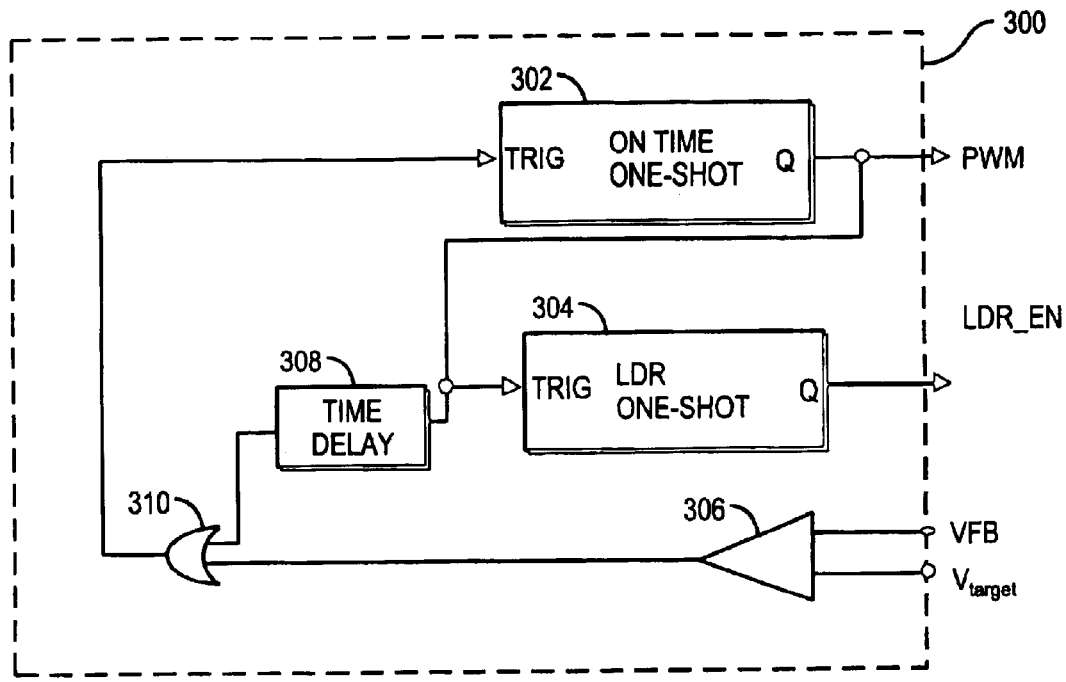
FIG. 3 is a block diagram of another embodiment of a controller for use with the DC to DC converter of FIG. 1.

Turning to FIG. 3, another embodiment of a controller 300 consistent with the invention is illustrated. Similar to the embodiment of FIG. 1A, the controller 300 provides a PWM control signal to an associated driver circuit based on the input voltage to the associated DC to DC converter less a signal representative of the output voltage, e.g., Vout or Vtarget. However, rather than charge and discharge an energy storage element, the controller 300 essentially counts blocks of time and provides the appropriate PWM and LDR_EN signal based on such counts.

For instance, the controller 300 may generally include an on-time one shot circuit 302, a low side driver one shot circuit 304, a comparator 306, a time delay circuit 308, and a NOR gate 310. The time delay circuit 308 may be a blanking circuit for generating retriggering of the on-time one shot circuit 302. The one shot circuits 302 and 304 may be triggered by the falling edge of the input signals.

Ideally, the on-time for the one shot circuit 302 is proportional to difference between the input voltage Vin of the DC to DC converter and a target voltage Vtarget for the output of the DC to DC converter and $T_{LDR}$ is proportional to Vtarget as detailed in equation (5).

$$\frac{T_{on}}{T_{LDR}} \cong \frac{V_{target}}{V_{in} - V_{target}} \quad (5)$$

In practice, $T_{LDR}$ is typically chosen to be slightly shorter than suggested by equation (5). There are several ways to produce Ton/$T_{LDR}$. Typically, Vtarget is either a fixed value or one changing in discrete steps. Both delays for the one shot circuits 302 and 304 can be digital with the actual delay being a multiple of an elementary time delay, e.g., delay To as given by equations (6) and (7) below.

$$Ton = To1 * M \quad (6)$$

$$T_{LDR} = To2 * N \quad (7)$$

Figure 4:
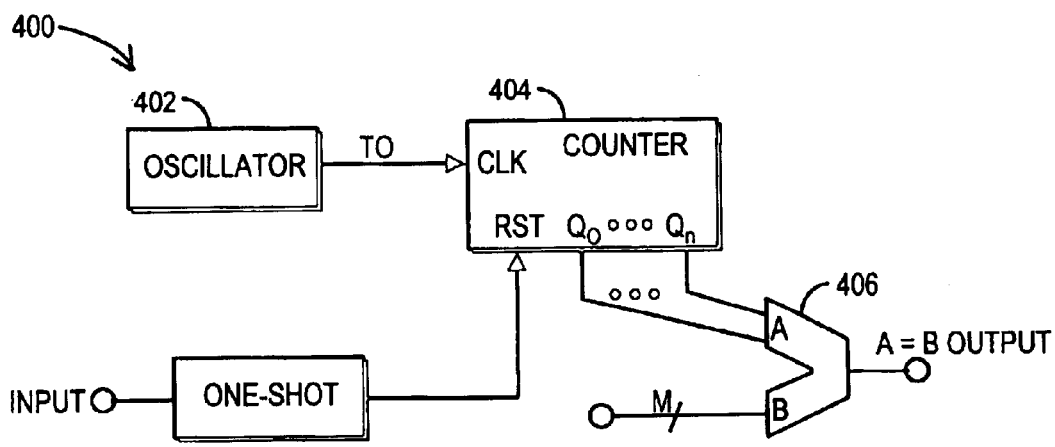
FIG. 4 is a more detailed block diagram of an exemplary delay circuit of FIG. 3.

Turning to FIG. 4, an exemplary delay circuit 400 is illustrated for producing the desired delay to maintain a proper time on for the on-time one shot circuit 302. The delay circuit 400 generally includes an oscillator 402 for producing time pulses, a counter 404 for counting the time pulses, and a digital comparator 406 for comparing the counted value to an applicable multiple such as M or N. The comparator thus provides an output signal indicative of whether or not the counter 404 has reached the necessary amount of counts M or N. Therefore, the applicable on time is controlled by counting the number of counts compared to the multiple M or N.

Hence controlling the multiple M and N essentially selects the applicable delay. Since Ton is a function of Vin and Vtarget and $T_{LDR}$ is a function of Vtarget, there are a couple of ways to control them. In a first case, To1 and To2 are equal and constant. As such, the multiple N may be produced by a lookup table (LUT) from the digital signal that sets Vtarget. The LUT in this instance is one dimensional since various N values correspond to an associated Vtarget value. In the same case where To1 and To2 are equal and constant, the multiple M may be produced by a LUT from both the digital signal that sets Vtarget and a digitalized Vin signal. Such a digitalized Vin signal may be obtained by utilizing an AD converter on Vin. As such, the LUT to produce M in this instance is bi-dimensional since M values correspond to an associated Vtarget and Vin values.

In another case, To1 and To2 are not equal. In this case, the multiple N is produced similarly as in the first case if To2 is constant. The multiple M may be produced by a uni-dimensional LUT having as an input the digital signal that sets Vtarget. However, To1 is not longer fixed but a function of either Vin or a function of both Vin and Vtarget.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A controller for a DC to DC converter configured to convert an input voltage to an output voltage, said controller configured to provide a PWM signal in a digital one state during a first time interval that is inversely proportional with a first signal representative of said input voltage less a second signal representative of said output voltage.

2. The controller of claim 1, wherein said second signal representative of said output voltage is a target voltage indicative of a desired level of said output voltage.

3. The controller of claim 1, wherein said second signal representative of said output voltage level is said output voltage.

4. The controller of claim 1, wherein said digital one state of said PWM signal drives a pair of switches to a switch ON state, and wherein a current level in an associated inductor increases during said switch ON state.

5. The controller of claim 1, wherein said controller is further configured to provide a low side enabling signal having an enabling and disabling state, wherein said PWM signal controls a low side switch of pair of switches when said low side enabling signal is in said enabling state.

6. The controller of claim 5, wherein said low side switch is OFF if said enabling signal is in said disabling state.

7. The controller of claim 1, said controller comprises:
a first current source configured to provide a first current level;
a second current source configured to provide a second current level; and
a capacitor configured to be charged by a charging current equal to said second current level less said first current level during said first time interval.

8. The controller of claim 7, wherein said digital one state of said PWM signal drives a pair of a switches to a switch ON state, and wherein a current level in an associated inductor increases during said switch ON state.

9. The controller of claim 8, wherein said first time interval has a start time and an end time, said start time occurring when a charge level on said capacitor is substantially zero and said end time occurring when a charge level on said capacitor reaches a predetermined charge level threshold.

10. The controller of claim 9, wherein said start time corresponds to a zero current level of said associated inductor.

11. The controller of claim 7, wherein said capacitor is discharged during a second time interval, and wherein said controller provides said PWM signal in a second state during said second time interval, wherein said second state of said PWM signal drives a pair of switch to a switch OFF state.

12. The controller of claim 11, wherein said capacitor is discharged during said second time interval by said first current level provided by said first current source at a first discharge rate.

13. The controller of claim 12, further comprising:
a third current source proportional to said output voltage and configured to provide a third current level, wherein said current level is greater than said first current level, and wherein said capacitor is discharged during said second time interval by said first current source and said third current source at a second discharge rate, where said second discharge rate is greater than said first discharge rate.

14. The controller of claim 11, wherein said second time interval has a start time and an end time, said start time occurring when a charge level of said capacitor reaches a predetermined charge level threshold and said end time occurring when a charge level of said capacitor is substantially zero.

15. The controller of claim 7, further comprising an output decision circuit, wherein said output decision circuit is configured to provide said PWM signal based on a charge level on said capacitor.

16. The controller of claim 7, wherein said controller is further configured to provide a low side enabling signal having an enabling and disabling state, wherein said PWM signal controls a low side switch of pair of switches when said low side enabling signal is in said enabling state.

17. The controller of claim 16, wherein said low side switch is OFF if said enabling signal is in said disabling state.

18. The controller of claim 1, wherein said controller comprises an on-time one shot circuit configured provide said PWM signal in said digital one state during said first time interval.

19. The control of claim 18, further comprising a delay circuit configured to control said first time interval.

20. The controller of claim 19, wherein said delay circuit comprises:
a counter configured to count pulses and provide a counter output signal representative of a number of counts; and
a digital comparator configured to accept said counter output signal and compare said counter output signal to a predetermined multiplier level, said digital comparator stopping said first time interval once said counter output signal reaches said predetermined multiplier level.

21. The controller of claim 19, wherein said predetermined multiplier level is provided by a look up table.

22. The controller of claim 21, wherein said look up table is configured to provide one of a plurality of said predetermined multiplier levels based on an associated said input voltage level and an associated target output voltage level.

23. The controller of claim 18, wherein said controller further comprises a low side switch enable one shot circuit configured to provide a low side enabling signal having an enabling and disabling state, wherein said PWM signal controls a low side switch of a pair of switches when said low side enabling signal is in said enabling state.

24. The controller of claim 19, wherein said low side switch is OFF if said enabling signal is in said disabling state.

25. A method of controlling a pair of switches in a DC to DC converter, said method comprising the steps of:
monitoring a first voltage level representative of an input voltage to said DC to DC converter;
monitoring a second voltage level representative of an output voltage of said DC to DC converter; and
determining a first time interval to drive a pair of switches to a switch ON state, said first time interval being inversely proportional with a difference between said first signal and said second signal.

26. The method of claim 25, wherein said first time interval is based on a time it takes to charge a capacitor to a predetermined threshold level.

27. The method of claim 25, wherein said first time interval is base on counting a plurality of pulses.

28. The method of claim 25, wherein said second voltage level is a target output voltage level indicative of a desired level of said output voltage.

29. The method of claim 25, wherein said second voltage level is said output voltage of said DC to DC convert.

30. A DC to DC converter for converting an input voltage to an output voltage, said DC to DC converter comprising:
a controller configured to provide a PWM signal in a digital one state during a first time interval that is inversely proportional with a first signal representative of said input voltage less a second signal representative of said output voltage;
a driver circuit configured accept at least said PWM signal and provide a switch driving signal;
a pair of switches including high side switch and a low side switch responsive to said switch driving signal to drive said of switches to a switch ON state where said high side switch is ON and said low side switch is OFF when said PWM signal is in said digital one state; and
an inductor coupled to an output of said pair of switches, wherein a current level in said inductor increases in said switch ON state.

31. The DC to DC converter of claim 30, wherein said controller is further configured to provide said PWM signal in a second state during a second time interval based on said second signal, said driver circuit responsive to said PWM signal in said second state to drive said pair of switches to a switch OFF state where said high side switch is OFF and said low side switch if ON, wherein said current level in said inductor decreases in said switch OFF state.

32. The DC to DC converter of claim 30, wherein said controller is further configured to provide a low side enabling signal having an enabling and disabling state, wherein said PWM signal controls said low side switch when said low side enabling signal is in said enabling state.

33. The DC to C converter of claim 32, wherein said low side switch is OFF in response to said disabling state said enabling signal.

34. The DC to DC converter of claim 30, wherein said controller comprises:
a first current source configured to provide a first current level;
a second current source configured to provide a second current level; and
a capacitor configured to be charged by a charging current equal to said second current level less said first current level during said first time interval.

35. The DC to DC converter of claim 34, wherein said first time interval has a start time and an end time, said start time occurring when a charge level on said capacitor is substantially zero and said end time occurring when a charge level on said capacitor reaches a predetermined charge level threshold, and wherein said start time corresponds to a zero current level of said inductor.

36. The DC to DC converter of claim 30, wherein said controller comprises an on-time one shot circuit configured to provide said PWM signal in said digital one state during said first time interval.

37. The controller of claim 5, wherein a time interval of said enabling state of said low side enabling signal is inversely proportional with said second signal representative of said output voltage.

* * * * *